United States Patent
Gantman et al.

(10) Patent No.: US 7,401,224 B2
(45) Date of Patent: Jul. 15, 2008

(54) SYSTEM AND METHOD FOR MANAGING SONIC TOKEN VERIFIERS

(75) Inventors: Alexander Gantman, San Diego, CA (US); Gregory G. Rose, Concord (AU)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 10/172,469

(22) Filed: Jun. 13, 2002

(65) Prior Publication Data

US 2003/0217269 A1     Nov. 20, 2003

Related U.S. Application Data

(60) Provisional application No. 60/380,651, filed on May 15, 2002.

(51) Int. Cl.
*H04L 9/32*     (2006.01)

(52) U.S. Cl. ........................................ 713/170; 713/185

(58) Field of Classification Search ................ 713/172, 713/173, 170, 186, 185; 340/5.22, 5.23, 340/5.24
See application file for complete search history.

(56) References Cited

U.S. PATENT DOCUMENTS

| | | | |
|---|---|---|---|
| 5,953,700 A | * | 9/1999 | Kanevsky et al. ........ 704/270.1 |
| 6,023,676 A | | 2/2000 | Erell |
| 6,084,967 A | | 7/2000 | Kennedy et al. |
| 6,213,391 B1 | * | 4/2001 | Lewis .......................... 235/380 |
| 7,251,730 B2 | | 7/2007 | Rose |
| 2001/0039619 A1 | | 11/2001 | Lapere et al. |

FOREIGN PATENT DOCUMENTS

WO     02/05078     1/2002

* cited by examiner

*Primary Examiner*—Benjamin E. Lanier
(74) *Attorney, Agent, or Firm*—Amin, Turocy & Calvin, LLP

(57) ABSTRACT

A hand-held token can be operated to generate an acoustic signal representing the digital signature generated by a private key of a public key/private key pair. Verifiers that might be located at, e.g., buildings, in vehicles, at bank ATMs, etc. receive the signal and retrieve the corresponding public key to selectively grant access authorization to components served by the verifiers. Methods and systems permit adding and removing a token from the access list of a verifier. Other methods and systems enable the token to be used with several verifiers that are nearby each other, such as might be the case with multiple vehicles owned by the same user and parked nearby each other, without more than one verifier being operated to grant access.

22 Claims, 4 Drawing Sheets

SYSTEM AND METHOD FOR MANAGING SONIC TOKEN VERIFIERS

RELATED APPLICATIONS

This application is related to co-pending U.S. patent application Ser. No. 10/077,365, filed Feb. 15, 2002, for an invention entitled "Method and Apparatus for Simplified Audio Authentication", is related to co-pending U.S. patent application Ser. No. 09/611,569, filed Jul. 7, 2000, for an invention entitled "Method and Apparatus for Simplified Audio Authentication", and to co-pending U.S. provisional patent application serial No. 60/380,651, filed May 15, 2002, for an invention entitled "System and Method for Managing Sonic Token Verifiers", all of which are incorporated herein by reference.

BACKGROUND OF THE INVENTION

I. Field of the Invention

The present invention relates generally to authentication using audio tones.

II. Background of the Invention

As Internet use has grown, many types of convenient electronic commerce have been made possible, such as, for example, buying goods and services online, banking online, and using automatic teller machines (ATM) that are linked to remote banks. But the very convenience of electronic commerce has made it easier for thieves to steal valuable information and/or to pose as someone they are not to purchase goods, withdraw money from bank accounts, and so on.

Accordingly, affording security in electronic transactions is crucial. To this end, many electronic transactions are encrypted, to conceal private information being exchanged. But encryption is only one aspect of security, since it only provides confidentiality. Encryption does not authenticate the parties involved or ensure the integrity/authenticity of the information being exchanged.

With this in mind, it readily may be appreciated that authentication is an important aspect of security. In terms of electronic commerce, the person seeking authentication does so through a computer interface. Consequently, it normally is not feasible to resort to checking a biological feature of the person (appearance, handwritten signature, fingerprint, and so on) to verify that the person is who he says he is, absent the widespread installation of an infrastructure of bio-sensing computer accessories.

This leaves two authentication factors available, namely, authenticating a person based on something the person has, such as a credit card or key fob, or based on something the person knows, such as a password or personal identification number (PIN). For some particularly sensitive applications such as ATM money withdrawals, both factors might be desirable.

The above-identified patent applications disclose handheld sonic-based "tokens" that a person can manipulate to transmit an acoustic signal to a device, referred to as an "authenticator" or "verifier", to authenticate the person based on the signal. As recognized in those applications, the advantage of sonic-based tokens is that a large installed infrastructure already exists to receive and transmit sound and electronic signals derived from sound. Specifically, the global telephone system exists to transmit data representative of acoustic information, and apart from telephones many computing devices that are now linked by this same system (as embodied in the Internet) have microphones and speakers (or can easily be modified to have them).

In the above-disclosed systems, a user can manipulate a token to send an acoustic signal to a verifier, with the acoustic signal representing a digital signature generated by using a private key known only to the user's token. The verifier receives the signal, converts it to electrical signals, and then uses a public key associated with the private key to verify the signature. Use of public key-private key principles facilitates robustness, in that a single token can be used for multiple purposes, such as for building access, vehicle access, ATM access, and so on, without the possibility that, for example, an unscrupulous security guard having access to a list of tokens authorized for building access could gain entrance to a vehicle or bank account that grants authorization to a token that happens to be on the building access list. Without the private key provided by the token, authorization cannot be granted by a verifier.

As recognized herein, the verifier can be controlled by a central computer that contains an access list used to verify a user's identity, based on the sonic signal received from a token. An example of such a verifier might be a building entrance verifier that allows entry into one or more buildings in a complex of buildings. To add or delete users from the access list, one need simply to modify the centrally-located list.

As also recognized herein, however, for certain other applications such as vehicle entry or home entry, verification is done at the location of the verifier, e.g., at the car or home. In these applications, adding or deleting a user from an access list can be more of a problem, because the verifier might not include a data entry device. Moreover, the present invention further recognizes that while it is desirable to enable a single token to be used to gain access to multiple verifiers, two closely located verifiers might receive the sonic activation signal and both grant access, when the user desires only access to one. For example, if a user has two vehicles parked in a driveway, both of which grant access based on a sonic token, it is desirable that the user be able to gain access to one of the vehicles without also unlocking the other vehicle, the front door of the house, etc. Having recognized these considerations, the invention described below is provided.

SUMMARY OF THE INVENTION

The present invention understands that authentication and authorization are related but different aspects of electronic security. Authentication establishes the user's identity, whereas authorization refers to permissions that the user has. After being authenticated, the user must still select one or more of the authorized functions to perform. That is one of the problems addressed herein.

As discussed in further detail below, one way to accomplish the above, is by using separate dedicated keys for each function. In this case, the authorization is implicitly accomplished by authentication. Another way recognized herein is for the message generated by the token to include a function identifier that specifies the requested function. In either case, the token must allow the user to specify either the key to use or function to request.

A still different approach is to select the desired function directly on the verifier, as also discussed herein. For example, the token can be used to log into a computer on which the user has multiple accounts, with the computer prompting the user to select or otherwise indicate the desired account.

As further recognized herein, a related problem is that the authorization details for each user must be programmed into the verifier. If the verifier has a convenient interface and staff assigned to program it, then the problem is simple. However, if the verifier is intended to be a standalone verifier and must be programmed by the owner directly (e.g., when the verifier is a vehicle), the verifier has a user management function and indicates a user authorized to use it. In case of a verifier with a centralized programming interface, the mere fact that one has physical access to it may provide the necessary authorization credentials (although an additional password would be more likely).

For standalone verifier, however, there are two basic problems to solve: getting authorization to perform the programming, and performing the actual programming. The first problem is fairly straightforward. If the verifier has been programmed to allow certain users to program it, then those users can authenticate and choose the programming function as described below.

The second part is somewhat more involved. Adding a new user to the verifier is easy since all that needs to be done is for the token to output its public key and current timestamp and for the manager to specify which functions this new user is authorized to perform.

Accordingly, a system for authentication includes a token that is operable to generate an acoustic signal. The token has at least one key identifier, such as a public key of a private key/public key pair. Plural verifiers are configured for receiving the acoustic signal and in response thereto accessing respective data structures that represent identities of authorized tokens to selectively grant access to respective components. Means are coupled to the token and/or to a verifier for adding the key identifier to the data structure that is associated with the verifier. The verifier can also access the public key corresponding to the token and a token clock value.

In an exemplary embodiment the means for adding may include means for inputting an addition request to the verifier, and means for causing the verifier to transmit a first signal that alerts the user that the verifier is ready to receive the key identifier. Means on the token are operable by a user to transmit the key identifier in an acoustic signal. If desired, means can be provided at the verifier for transmitting an acknowledgement signal that the key identifier has been successfully added to the data structure, which can be a list, database table, or other structure.

In another aspect, a system for authentication includes a token that can be operated to generate an acoustic signal. Plural verifiers are configured for receiving the acoustic signal and in response thereto accessing respective data structures representing identities of authorized tokens to selectively grant access to respective components. Means are coupled to the token and/or to a verifier for removing the key identifier from the data structure associated with the verifier.

In an exemplary embodiment, the means for removing may include means on the token for inputting a removal request to the verifier, and means for removing the key identifier from the data structure in response to the removal request. Or, the means for removing may include means for retrieving a recording of the key identifier, and means accessing the recording to remove the key identifier from the data structure. Still further, if neither the token nor recording are available, means can be provided for associating an audio label with the token, with means facilitating removal of the key identifier from the list based on the audio label.

In still another aspect, a method for authentication includes transmitting a public key identifier associated with a token in an acoustic signal to a verifier. The method also includes adding the key identifier to a data structure that is accessible to the verifier, with the data structure representing identities of authorized tokens. An acoustic signal is generated from the token. The signal is associated with a private key identifier. The acoustic signal is received at the verifier and in response thereto the data structure is accessed to selectively grant access to a component.

In yet another aspect, a method for authentication includes adding a key identifier to a data structure that is accessible to a verifier, with the key identifier identifying a token. The method includes selectively granting access to a component associated with the verifier in response to acoustic authorization signals from the token, and then selectively removing the key identifier from the data structure.

In another aspect, an authentication system includes a token configured for generating at least first and second acoustic signals, with each signal representing a private key-generated digital signature. A first verifier is configured for receiving acoustic signals and granting authorization to the user upon receipt of the first acoustic signal but not upon receipt of the second acoustic signal. Also, a second verifier is configured for receiving acoustic signals and granting authorization to the user upon receipt of the second acoustic signal but not upon receipt of the first acoustic signal.

In another aspect, a method is disclosed for selectively granting authorization to a bearer of a token to one of plural verifiers. The method includes establishing a keyword for each verifier, and gaining authorization access from a verifier. The access is gained by speaking the keyword associated with the verifier and operating an activation element on the token to generate an acoustic authorization request receivable by the verifier. Authorization is selectively granted, based on the keyword and acoustic authorization request.

In another aspect, an authorization system includes plural tokens, with each generating a unique acoustic authorization request. The tokens are stackably engageable with each other.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
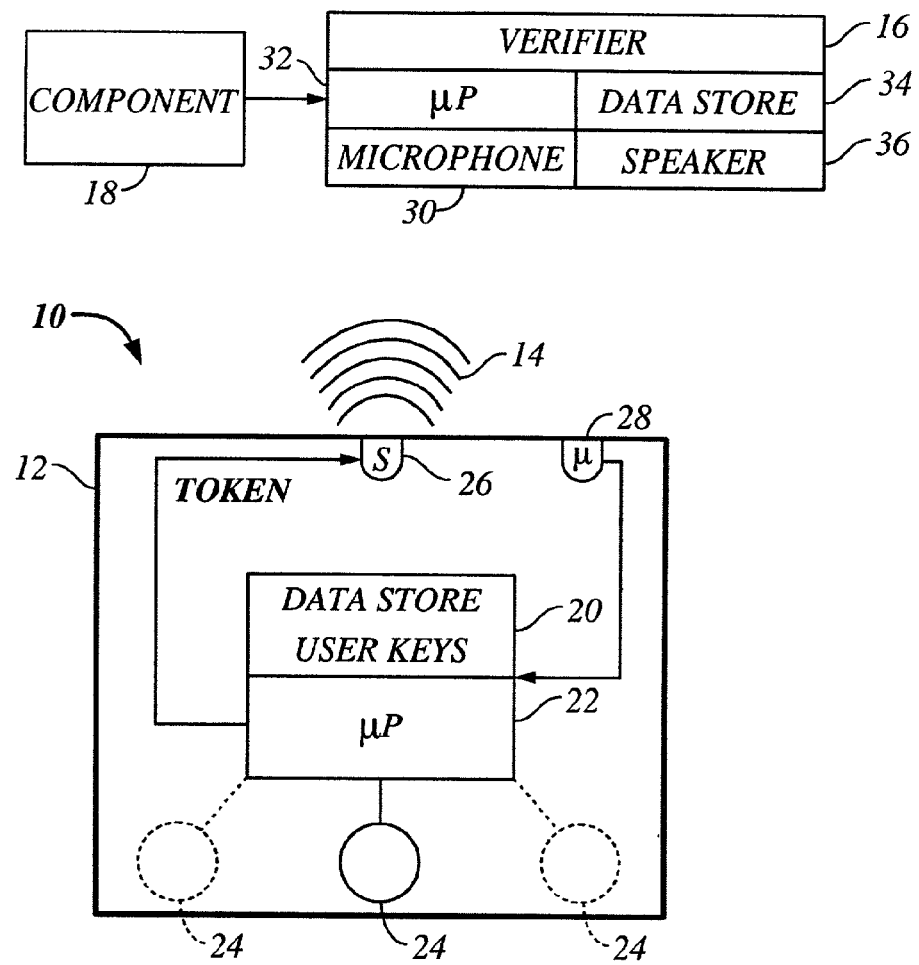
FIG. 1 is a block diagram of the present system for audio-based authentication, showing a first embodiment of the present sonic token.

Referring initially to FIG. 1, a system is shown, generally designated 10, that includes a token 12. The token 12 can be hand-held, e.g., it can be configured as a key fob or other small device. The present invention, however, applies to other token configurations, such as mobile communication stations including laptop computers, wireless handsets or telephones, data transceivers, or paging and position determination receivers that can be hand-held or portable as in vehicle-mounted (including cars, trucks, boats, planes, trains), as desired. Wireless communication devices are also sometimes referred to as user terminals, mobile stations, mobile units, subscriber units, mobile radios or radiotelephones, wireless units, or simply as "users" and "mobiles" in some communication systems. Indeed, the token 12 need not be portable but preferably is portable.

In any case, the token 12 can generate an acoustic signal, represented schematically by the lines 14, that can be received by a verifier 16. The verifier 16 selectively grants access to a component 18, based on the acoustic signal 14. The component 18 may be a building, a home, a vehicle, an ATM, or any other component to which it is desired to limit access to pre-authorized users.

The acoustic signal 14 can represent a digital signature generated by a private key stored in an electronic data store 20 of the token 12. Corresponding public keys can also be stored therein for purposes to be shortly disclosed. In accordance with private key/public key principles known in the art and set forth in, e.g., the National Institute for Standards and Technology (NIST) Federal Information Processing Standards Publication 186-2, January, 2000, the signature algorithm in the token 12 (executed by a microprocessor 22 within the token 12) combines the private key with the message to be signed and with a random number "k" from a PN generator associated with the microprocessor 22 to render a digital signature which is a random pair (r,s). The identification of the corresponding public key may also be transmitted along with the digital signature.

The microprocessor 22 receives activation signals from, e.g., one or more activation elements 24 such as toggle switches, voice activation devices, or pushbuttons. It is to be understood that the microprocessor 22 can include a digital processor proper as well as necessary analog to digital and digital to analog conversion circuitry known in the art.

The microprocessor 22 accesses the data store 20, such that when multiple activation elements 24 are used, one or more can be associated with a respective key in the store 22. An electronic signature signal generated by using the particular key associated with the activation element that has been manipulated is sent to an audio speaker 26 for transformation of the electronic signal to the acoustic signal 14. The acoustic signal may or may not be audible. If desired, a microphone 28 can also be provided on the token 12 to receive acoustic signals and transform them to electronic signals, which are sent to the microprocessor 22 for processing.

The acoustic signal 14 is received by a microphone or other acoustic receiving device 30 at the verifier 16. The acoustic signal is transformed by the microphone 20 to an electronic signal and sent to a microprocessor 32, which accesses a data store 34 to retrieve from a data structure such as a list or database table the public key associated with the private key that generated the signal. Alternatively, the microprocessor 32 and data store 34 can be located centrally, away from the verifier, e.g., the microprocessor 32 and data store 34 can be located at the component 18. In any case, using the public key, the microprocessor 32 verifies the signature from the token 12 and based thereon, grants access to the user of the token 12 provided the token 12 is on an access data structure such as a list or database table in the data store 34. If desired, a speaker 36 can also be provided on the verifier 16 to send acoustic signals back to the token 12, which signals are received by the microphone 28 on the token 12.

Figure 2:
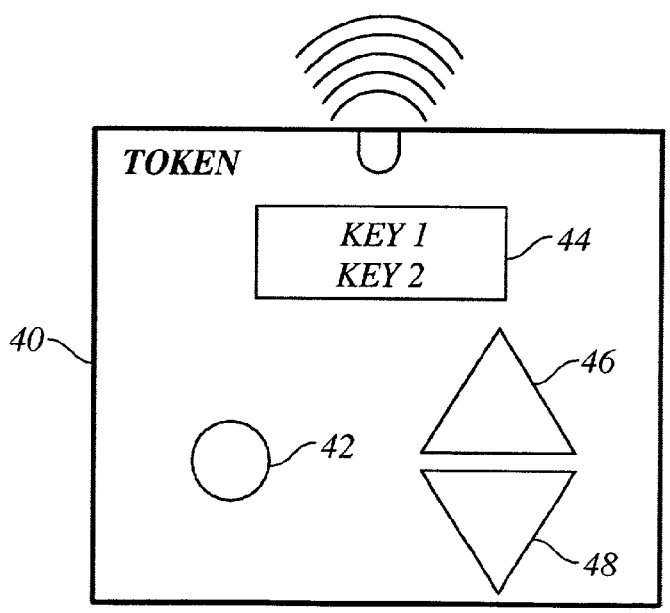
FIG. 2 is a block diagram of an alternate token.

FIG. 2 shows an alternate token 40 which in all essential respects is substantially identical to the token 12 shown in FIG. 1, except that it has, in addition to an activation element 42, a window 44 that displays plural key identities which are sequentially highlighted as the user scrolls through the key identities using up and down selectors 46, 48. When the desired key is highlighted, the user operates the activation element 42 to send an acoustic signal representative of a signature generated by the key.

Figure 3:
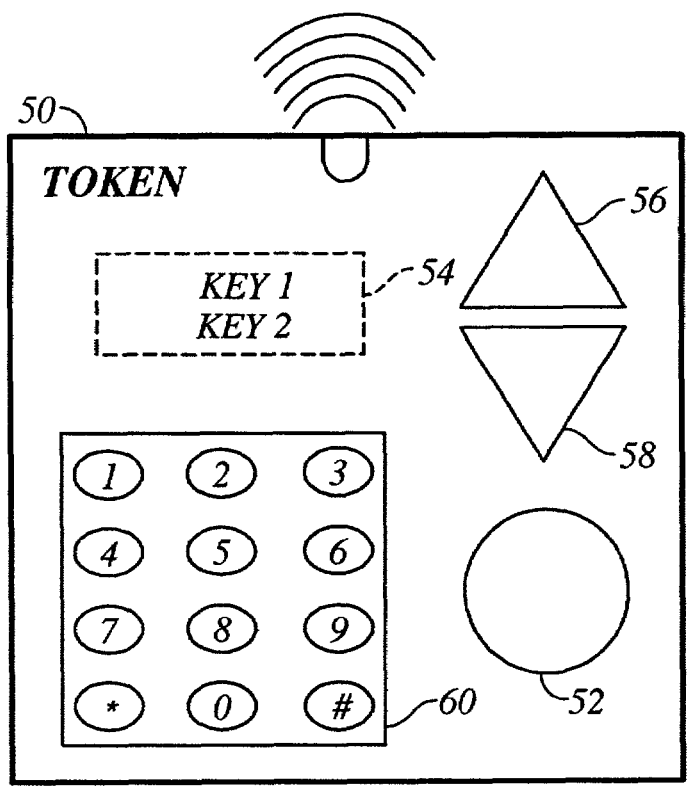
FIG. 3 is a block diagram of another alternate token.

FIG. 3 shows yet another token 50 which in all essential respects is substantially identical to the token 40 shown in FIG. 2, except that it has, in addition to an activation element 52, window 54 that displays plural key identities, and selectors 56, 58, a keypad 60 that can be used to key in alphanumeric or numeric-only data that can be transmitted in an acoustic signal.

Figure 4:
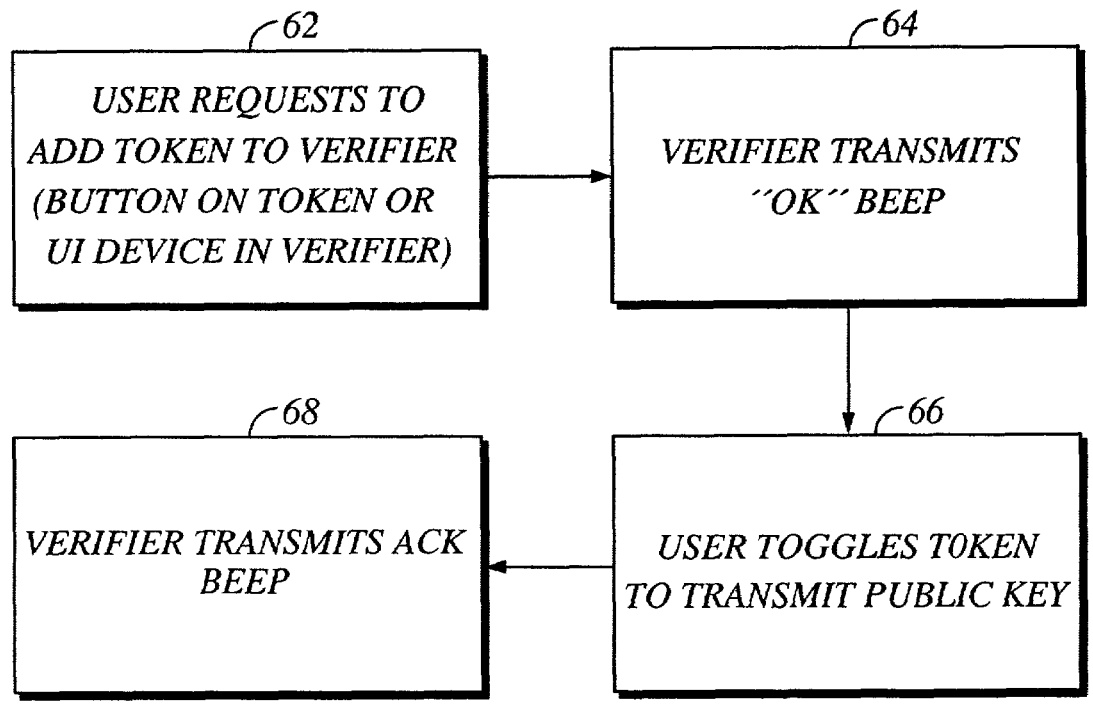
FIG. 4 is a flow chart of the logic for adding a token to a verifier's list.

Now referring to FIG. 4, a method for adding at least one (and potentially plural) key identifiers to the access list of a verifier can be seen. Commencing at block 62, a user of a token issues a request to add the key associated with the token 12 to the verifier. The token used for adding the key associated with the token 12 can be the token 12 itself (i.e., the user is self-authorized to add his or her token to the verifier), but more preferably the token that is used to add the key associated with the token 12 is a separate management token (not shown) that is possessed only by authorized personnel and that otherwise can be configured substantially identically to the token 12. Or, the addition can be accomplished by appropriately manipulating an input device associated with the verifier (by inputting, for example, a management code indicating that an authorized person is adding the token key).

When using the token 12 or a management token to undertake the logic of FIG. 4, a predetermined one of the token's activation elements that is dedicated to generate an acoustic "request to add" signal can be manipulated. Or, the authorized adding user can scroll down the window of the token until a "request to add" message is displayed, prompting manipulation of an activation element to send an acoustic request to add signal. Yet again, a user can enter an appropriate "request to add" code using the keypad of the token and then toggling an associated activation element to cause an acoustic request to add signal to be transmitted.

At block 64, the verifier receives the request to add signal and when it is ready to receive the key identifier, transmits back an "OK" beep or other acoustic signal or visual signal that the user can hear (or see) to alert the user that the verifier is ready to receive the key identifier. Moving to block 66, the user manipulates one of the above-described input device mechanisms to acoustically transmit to the verifier the identifier associated with the token's key or keys. The identifier can be or can include, e.g., the public key of the token. If desired, the verifier can transmit back an acknowledgement signal at block 68, signifying that the token has been added to the access list. The acknowledgement signal can be audible, or visual, or other appropriate signal such as a tactile signal that might be generated by the token in response to a signal from the verifier. The verifier preferably accesses the public key of a token on its list as well as a token clock value as set forth in the above-referenced applications.

Figure 5:
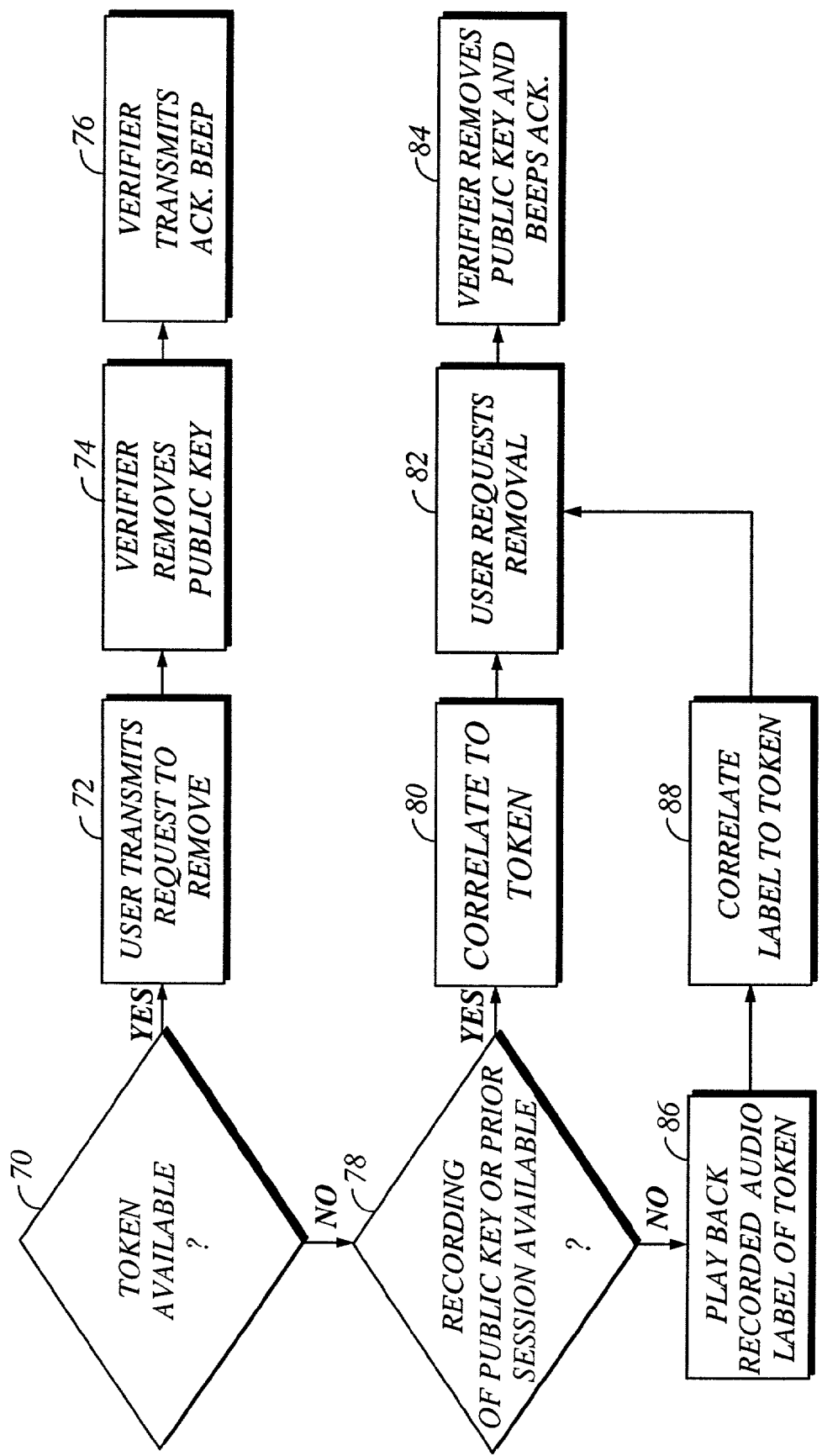
FIG. 5 is a flow chart of the logic for removing a token from a verifier's list.

FIG. 5 illustrates the logic that can be used to remove a key identifier from an access list of a verifier. Decision diamond 70 simply indicates that when the token sought to be removed remains available, at block 72 the user can transmit a "request to remove" signal in accordance with the principles set forth above for adding a token to the list. At block 74, the verifier removes the key identifier from the access list, and then at block 76 the verifier transmits an acknowledgement signal to the user, signifying that the token has been successfully removed from that verifier's list.

On the other hand, if the token sought to be removed is lost, stolen, or otherwise unavailable, decision diamond 78 simply indicates that if a recording of the public key of the token, or indeed of a previous authorization session with the token is available, it is provided to the verifier at block 80 by, e.g., playing back an acoustic version of the recording in range of the microphone of the verifier, or by sending an electronic signal representing the recording of the public key to the verifier through any suitable communication interface. At block 82, the user requests that the public key (and, hence, the token) be removed from the access list by, e.g., manipulating or causing to be manipulated an input device associated with the verifier. Proceeding to block 84, the verifier removes the public key from its access list and if desired sends an acoustic acknowledgement message to the person requesting removal.

In contrast, if the token sought to be removed is unavailable and no recording of the public key is available, at block 86 a recorded audio label representing the token can be played back or otherwise displayed in response to the user inputting a request for removal in accordance with input principles discussed above. In one exemplary embodiment, when a token is added to the list of a verifier, the user or verifier manager can speak the label (e.g., the user's name) into the microphone of the verifier so that the verifier can associate the label with the key identifier (e.g., the public key). Then, when the user or manager desires to remove the token (as represented by the token's key or keys) from the access list, the label is spoken or otherwise input to the verifier, where it is correlated with the key identifier at block 88. The logic then flows to block 82 and removes the key identifier from the access list as described above.

Figure 6:
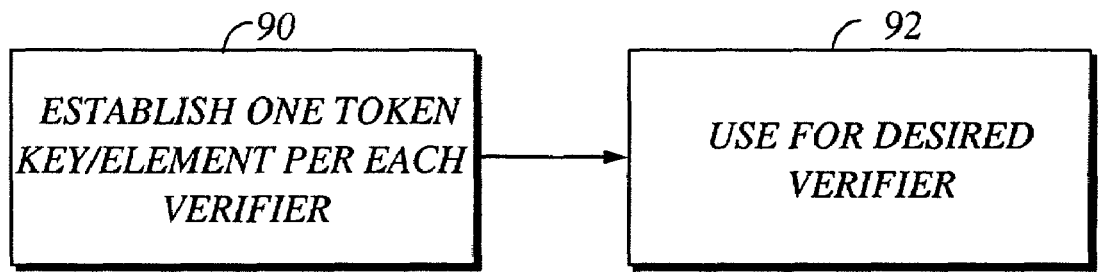
FIG. 6 is a flow chart of the logic for discriminating among several adjacent verifiers.
Figure 7:
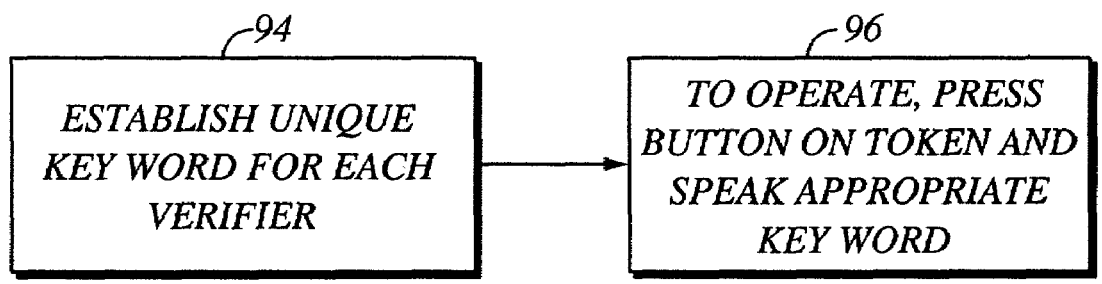
FIG. 7 is a flow chart of alternate logic for discriminating among several adjacent verifiers.
Figure 8:
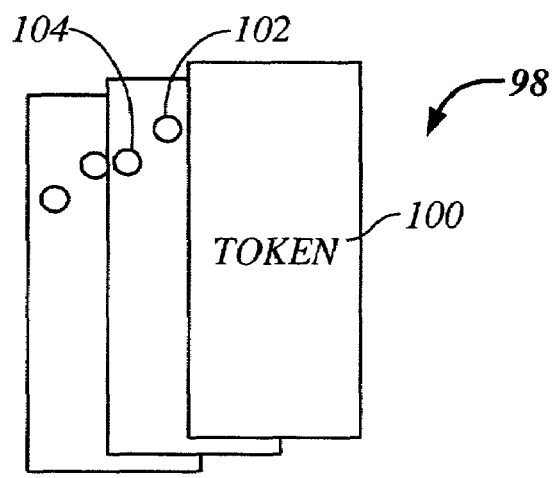
FIG. 8 is a schematic diagram showing physically stackable tokens.

FIGS. 6-8 illustrate various systems and methods for managing verifiers that might happen to be nearby each other, to prevent simultaneous granting of authorization from multiple verifiers when access to only one is desired. Commencing at block 90 in FIG. 6, one token private key/activation element is allocated to each verifier sought to be granted access to. In the case of the token 12 shown in FIG. 1, one respective activation element 24 is assigned to each verifier, with each activation element 24, when manipulated by a user, causing a respective authorization signal to be sent. In this way, only the verifier associated with the particular element 24 being manipulated is activated. In the case of the token 40 shown in FIG. 2 or token 50 shown in FIG. 3, one respective key is assigned to each verifier, with the user scrolling through the keys until the key associated with the verifier with which authorization is sought is highlighted.

Subsequent manipulation of the activation elements 42, 52 cause the key to be transmitted in an acoustic signal, such that other nearby verifiers that require different keys will not grant access. Or yet again, the user can manipulate the keypad 60 on the token 50 shown in FIG. 3 to identify which key or which verifier, by number, is sought for access. At block 92, the key that is transmitted might be detected and processed by all nearby verifiers, but only the verifier with which the key has been associated will grant access.

FIG. 7 shows another method for verifier management. Commencing at block 94, a unique keyword is established for each verifier. For example, an initialization can be executed during which the user speaks the name of a car make into the microphone of a verifier that is associated with the car, and then the user activates any one of the tokens 12, 40, 50 to transmit a common authorization signal. The unique keyword is saved by the verifier and associated with the common authorization signal. Subsequently, when authorization is desired from the verifier the user speaks the keyword and manipulates the activation element of the token, with only the verifier associated with the spoken keyword granting authorization. Other nearby verifiers, while successfully decoding the common authorization signal using their public keys, do not grant authorization because their keywords have not been spoken.

FIG. 9 shows a system, generally designated 98, of physically stackable single-key tokens 100. Each token 100 can include, on a bottom surface, an engagement element 102 such as a post or rib that mates with an engagement receptacle 104 on another token 100. Each token is associated with a respective verifier, and each token generates a unique acoustic authorization request. The user stacks the tokens together as a single unit, manipulating the appropriate token 100 for the verifier from which authorization is sought.

While the particular SYSTEM AND METHOD FOR MANAGING SONIC TOKEN VERIFIERS as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

What is claimed is:

1. A system for authentication, comprising:
    at least one hand-held token operable to generate at least one acoustic signal representing a digital signature, the token being associated with a key identifier;
    plural verifiers configured for receiving the acoustic signal and in response thereto accessing respective data structures representing identities of authorized tokens to selectively grant access to respective components; and
    means coupled to the token and/or coupled to at least one verifier for adding the key identifier to the data structure associated with the verifier in response to a request at the token.

2. The system of claim 1, wherein the means for adding includes:
    means for inputting an addition request to the verifier;
    means for causing the verifier to transmit a first audible signal; and
    means on the token operable by a user to transmit the key identifier in an acoustic signal.

3. The system of claim 2, further comprising means for transmitting an acknowledgement audible signal from the verifier to signal that the key identifier has been successfully added to the data structure.

4. The system of claim 1, wherein the data structure is a list.

5. The system of claim 1, wherein the key identifier is a public key of a private key/public key pair.

6. A system for authentication, comprising:
at least one hand-held token operable to generate at least one acoustic signal representing a digital signature, the token being associated with a key identifier;
plural verifiers configured for receiving the acoustic signal and in response thereto accessing respective data structures representing identities of authorized tokens to selectively grant access to respective components; and
means coupled to the token and/or coupled to at least one verifier for removing the key identifier from the data structure associated with the verifier in response to a request at the token.

7. The system of claim 6, wherein the means for removing includes:
means on the token for inputting a removal request to the verifier; and
means for removing the key identifier from the data structure in response to the removal request.

8. The system of claim 6, wherein the means for removing includes:
means for retrieving a recording of the key identifier; and
means accessing the recording for removing the key identifier from the data structure.

9. The system of claim 6, wherein the means for removing includes:
means for associating an audio label with the token; and
means for facilitating removal of the key identifier from the list based on the audio label.

10. The system of claim 6, wherein the data structure is a list.

11. The system of claim 6, wherein the key identifier is a public key of a private key/public key pair.

12. A method for authentication, comprising:
transmitting a public key identifier associated with a token in an acoustic signal to a verifier;
adding the key identifier to a data structure accessible to the verifier, the data structure representing identities of authorized tokens;
generating at least one acoustic signal from the token, the signal being associated with a private key identifier; and
receiving the acoustic signal at the verifier and in response thereto accessing the data structure to selectively grant access to a component.

13. The method of claim 12, further comprising:
inputting an acoustic addition request to a verifier; and
causing the verifier to transmit a first audible signal to signal verifier readiness to receive the public key identifier.

14. The method of claim 13, further comprising transmitting an acknowledgement audible signal from the verifier to signal that the public key identifier has been successfully added to the data structure.

15. The method of claim 12, wherein the data structure is a list.

16. A method for authentication, comprising:
adding at least one key identifier to a data structure accessible to a verifier, the key identifier identifying a hand-held token;
selectively granting access to at least one component associated with the verifier in response to acoustic authorization signals representing digital signatures from the token; and
removing the key identifier from the data structure in response to a removal request from the token.

17. The method of claim 16, comprising:
retrieving a recording of the key identifier; and
accessing the recording to remove the key identifier from the data structure.

18. The method of claim 16, comprising:
associating at least one label with the token;
providing the label to the verifier; and
removing the key identifier from the list using the label.

19. The method of claim 16, wherein the data structure is a list.

20. The method of claim 16, wherein the key identifier is a public key of a private key/public key pair.

21. A system for authenticating a device, comprising:
a plurality of tokens each operable to generate at least one acoustic signal designating a public key of the at least one token: and
plural verifiers that in response to receiving the acoustic signal designating the public key, access respective data structures representing identities of the plurality of tokens to selectively grant access to respective components; and
a processor coupled with plurality of verifiers that is capable of at least one of adding and removing a key identifier associated with the public key designated by the acoustic signal transmitted from a token of the plurality of tokens in response to a request transmitted by the token.

22. The system of claim 21, wherein at least one token of the plurality of tokens includes a plurality of public keys and a different acoustic signal is associated with each public key to uniquely designate each of the plurality of public keys.

* * * * *